US012623173B2

(12) United States Patent
Killingbeck

(10) Patent No.: US 12,623,173 B2
(45) Date of Patent: May 12, 2026

(54) DEVICE FOR REFRIGERATION SYSTEM

(71) Applicant: Tree Associates Ltd, Norwich (GB)

(72) Inventor: Bernard Killingbeck, Norwich (GB)

(73) Assignee: Tree Associates Ltd, Norwich (GB)

( * ) Notice: Subject to any disclaimer, the term of this patent is extended or adjusted under 35 U.S.C. 154(b) by 357 days.

(21) Appl. No.: 18/039,862

(22) PCT Filed: Dec. 3, 2021

(86) PCT No.: PCT/GB2021/053172
§ 371 (c)(1),
(2) Date: Jun. 1, 2023

(87) PCT Pub. No.: WO2022/118039
PCT Pub. Date: Jun. 9, 2022

(65) Prior Publication Data
US 2024/0001261 A1 Jan. 4, 2024

(30) Foreign Application Priority Data
Dec. 4, 2020 (GB) ...................................... 2019145

(51) Int. Cl.
B01D 45/08 (2006.01)
B01D 19/00 (2006.01)
(Continued)

(52) U.S. Cl.
CPC ......... B01D 45/08 (2013.01); B01D 19/0042 (2013.01); F25B 43/00 (2013.01); F25B 43/043 (2013.01); F25B 2400/23 (2013.01)

(58) Field of Classification Search
None
See application file for complete search history.

(56) References Cited

U.S. PATENT DOCUMENTS 1,169,919 A * 2/1916 Brassert ................. B01D 45/10
55/282
4,483,697 A 11/1984 Deysson et al.
(Continued)

FOREIGN PATENT DOCUMENTS

| CN | 101310154 A | * 11/2008 | ........... B01D 19/001 |
| JP | 2011212545 A | 10/2011 | |
| WO | 2015044079 A1 | 4/2015 | |

OTHER PUBLICATIONS

CN101310154A_Eng (Espacenet machine translation of Kazutaka) (Year: 2008).*

(Continued)

*Primary Examiner* — Gabriel E Gitman
(74) *Attorney, Agent, or Firm* — Erise IP, P.A.

(57) ABSTRACT

A device for reducing gas density in a liquid phase refrigerant in a refrigeration system is provided, the device comprising; a fluid inlet; a first outlet; a second outlet; a conduit, linking the fluid inlet to the first and second outlets; and a baffle, arranged within the conduit between the accelerator and the first outlet; wherein, the accelerator is configured to accelerate fluid from the fluid inlet towards the outlets, thereby separating out saturated gas in the fluid to reduce the gas density in the fluid; and the baffle is configured to direct the flow of lower gas density fluid towards the second outlet, and allows higher gas density fluid to pass around the baffle towards the first outlet. By providing a device in this manner, the energy efficiency and quality of refrigeration in a refrigeration system is improved.

20 Claims, 3 Drawing Sheets

(51) Int. Cl.
  F25B 43/00        (2006.01)
  F25B 43/04        (2006.01)

(56)                References Cited

U.S. PATENT DOCUMENTS

| 5,124,029 | A | * | 6/1992 | Fjallstrom | B01D 33/15 |
| | | | | | 209/250 |
| 5,857,347 | A | * | 1/1999 | Haugen | F25B 41/315 |
| | | | | | 62/211 |
| 6,251,167 | B1 | | 6/2001 | Berson | |
| 2009/0084718 | A1 | | 4/2009 | Prisco et al. | |
| 2011/0303090 | A1 | | 12/2011 | Wolz et al. | |
| 2018/0066880 | A1 | | 3/2018 | Ranjan et al. | |
| 2019/0024550 | A1 | * | 1/2019 | Curras-Guede | F01N 3/005 |

OTHER PUBLICATIONS

PCT Patent Application No. PCT/GB2021/053172 International Search Report and Written Opinion issued Feb. 10, 2022.

* cited by examiner

Gas

Liquid 5,9

4

11     12     10

111

11     12     10

DEVICE FOR REFRIGERATION SYSTEM

RELATED APPLICATION

The present application is a national stage application under 35 U.S.C. § 371 of International Application No. PCT/GB2021/053172, filed Dec. 3, 2021, which claims priority to Great Britain Patent Application No. 2019145.8, filed Dec. 3, 2020. The above referenced applications are hereby incorporated by reference.

FIELD

The present invention relates to a device for reducing gas density in a liquid phase refrigerant in a refrigeration system, together with a related refrigeration system.

A wide variety of refrigeration systems are known and a common form employs vapour-compression refrigeration. Such a system circulates a refrigerant fluid through a compressor, a condenser, an expansion valve (or similar component), and an evaporator in order to remove heat from an enclosed space nearby the evaporator. The expansion valve abruptly reduces the pressure of the condensed liquid refrigerant, producing a gas-liquid fluid mixture that is cooler than the enclosed space. The fluid absorbs heat from the surrounding enclosed space as it passes through the evaporator towards the compressor, where it is compressed and driven through the system to begin the cycle again.

Refrigeration systems are required to operate continuously for extended periods of time and so are driven by a need to minimise energy consumption while providing high refrigeration efficiency. Existing attempts to minimise energy consumption often focus on improving the compressor, but these can be expensive and difficult to maintain.

The present invention seeks to provide a device that improves the efficiency of refrigeration systems and the quality of the refrigeration, and yet is simple and easy to maintain.

SUMMARY

According to a first aspect of the present invention there is provided a device for reducing gas density in a liquid phase refrigerant in a refrigeration system, the device comprising: a fluid inlet; a first outlet; a second outlet; a conduit, linking the fluid inlet to the first and second outlets; an accelerator, arranged within the conduit between the fluid inlet and both the first and second outlets; and a baffle, arranged within the conduit between the accelerator and the first outlet; wherein, the accelerator is configured to accelerate fluid from the fluid inlet towards the outlets, thereby separating out saturated gas in the fluid to reduce the gas density in the fluid; and the baffle is configured to direct the flow of lower gas density fluid towards the second outlet, and allows higher gas density fluid to pass around the baffle towards the first outlet.

In this way, the device is able to reduce gas density from the fluid refrigerant and return it to a compressor (or equivalent component in the refrigeration system) separate from the higher liquid density fluid that will be directed from the second outlet to an evaporator. This reduces the work required for the compressor to drive the fluid through the refrigeration system, thereby improving the energy efficiency of the system. In addition, the device improves the quality of refrigeration (as the liquid density of the fluid in the evaporator will be greater than in a system without the device).

The simple design of the device's inlet and outlets means that it can be easily introduced to a refrigeration system, replaced or removed for maintenance. Preferably, the device has no moving components in order to increase its service life.

Preferably, the baffle is a solid component that does not allow fluid to pass through the baffle, thereby better redirecting fluid around the baffle towards the first and/or second outlet.

Preferably, the device is configured to reduce gas density of a pure refrigerant (i.e., a refrigerant fluid without contaminants).

The conduit may comprise a branching channel leading from the baffle to the second outlet.

The accelerator may comprise a plurality of valves, wherein the inner diameter of a first valve is greater than the inner diameter of the second valve, and wherein the first valve is upstream from the second valve.

Using a series of narrowing valves as the accelerator allows the fluid to be accelerated in a controlled manner without requiring additional work to be introduced to the system.

The device may further comprise a plurality of baffles sequentially arranged along the conduit between the accelerator and first outlet; wherein each baffle of the plurality of baffles is configured to direct the flow of lower gas density fluid towards the second outlet, and allow higher gas density fluid to pass around the baffle towards the first outlet.

In this way, a greater degree of gas density/liquid density separation may be provided by the device, as each additional baffle further separates gas density and liquid density of the fluid. Preferably, each baffle of the plurality of baffles is a solid component that does not allow fluid to pass through said each baffle, thereby better redirecting fluid around the plurality of baffles towards the first and/or second outlet.

When the device comprises a plurality of baffles, the conduit may further comprise a manifold arranged between the plurality of baffles and the second outlet; a plurality of branching channels, where each branching channel of the plurality of branching channels leads from a baffle of the plurality of baffles to the manifold.

After separation by the baffle(s), the manifold and branching channel(s) help to prevent higher gas density fluid from mixing and recombining with lower gas density portions of the fluid.

The second outlet may comprise an inner conduit and an outer conduit; wherein the outer conduit is arranged around the inner conduit; and the walls of the inner conduit comprise a membrane permeable to gas and impermeable to liquid. Preferably, fluid flowing to the second outlet from the conduit or manifold passes into the inner conduit. As the higher gas density fluid flows through the inner conduit near the edges of the inner conduit, additional gas density/liquid density separation of the fluid may be provided as the gas passes through the membrane into the outer conduit. Preferably, the membrane fully extends fully across the walls of the inner conduit (i.e. the length and circumference of the walls of the inner conduit), this allows gas to pass from the inner conduit to the outer conduit at any radial point of the inner conduit. The membrane may be self-supporting. In other examples, the membrane may be arranged in sections across the walls of the inner conduit with support sections of the walls reinforcing the membrane (e.g. a frame in front or behind the membrane, or a support element such as a beam next to the membrane or between adjacent membrane sections).

According to a second aspect of the invention, there is provided a refrigeration system comprising the device according to the first aspect.

The refrigeration system may further comprise a compressor fluidly connected to the first outlet and the second outlet of the device; an evaporator arranged between the compressor and the second outlet of the device; wherein, in use, fluid from the second outlet passes through the evaporator before entering the compressor, and fluid from the first outlet does not pass through the evaporator before entering the compressor.

The evaporator may comprise evaporator pipework, wherein the evaporator pipework comprises an inner conduit and an outer conduit arranged around the inner conduit, the walls of the inner conduit comprising a membrane permeable to gas and impermeable to liquid. Preferably the membrane of the evaporator pipework fully extends fully across the walls of the inner conduit of the evaporator pipework (i.e. the length and circumference of the walls of the inner conduit), this allows gas to pass from the inner conduit to the outer conduit at any radial point of the inner conduit. The membrane may be self-supporting. In other examples, the membrane may be arranged in sections across the walls of the inner conduit with support sections of the walls reinforcing the membrane (e.g. a frame in front or behind the membrane, or a support element such as a beam next to the membrane or between adjacent membrane sections).

Preferably, the evaporator is configured such that, in use, fluid enters the evaporator pipework in the inner conduit, and as the fluid flows through the pipework then gas from the fluid passes through the membrane into the outer conduit. In this way, the liquid density of the fluid within the inner conduit is kept higher to improve refrigeration quality.

The refrigeration system may further comprise a buffer tank; wherein the buffer tank is arranged between the compressor and the first outlet of the device, and the buffer tank is arranged between the compressor and the evaporator. In this way, the buffer tank prevents any liquid refrigerant from entering the compressor.

The refrigeration system may be a closed refrigeration system such that fluid cannot leave the refrigeration system. This provides a closed refrigeration cycle having higher efficiency than an open refrigeration cycle, and avoiding the need to introduce further refrigerant fluid into the system.

Preferably, the fluid comprised within the refrigeration system is a pure refrigerant (i.e., a refrigerant fluid without contaminants).

BRIEF DESCRIPTION OF THE DRAWINGS

Aspects of the invention will now be described, by way of example only, with reference to the accompanying drawings, in which.

DETAILED DESCRIPTION

Figure 1:
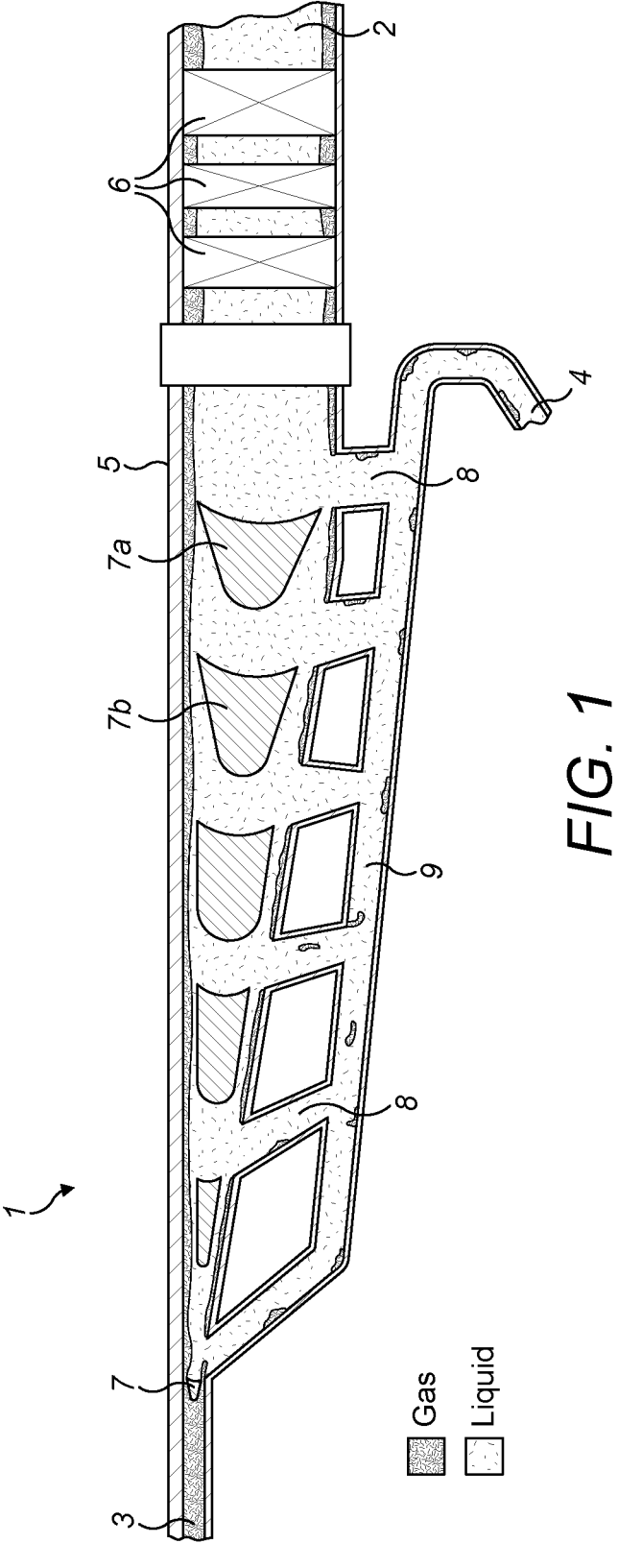
FIG. 1 shows an example configuration of a device according to the present invention.

Referring to FIG. 1, a device 1 has a conduit 5 for allowing the flow of a refrigerant fluid from a fluid inlet 2, through the conduit 5, towards a first outlet 3 and a second outlet 4. The refrigerant may be carbon dioxide, ammonia or any other appropriate refrigerant. For the purpose of this description, a first component of the device 1 is referred to as "upstream" of a second component if the first component is closer to the fluid inlet 2 than the second component is. Continuing with this example the second component is "downstream" from the first component.

In use, the device 1 is arranged in a refrigeration system after an expansion valve (or equivalent component) that abruptly reduces the pressure of a condensed liquid refrigerant, producing a saturated liquid-gas mixture that enters the device 1 through the inlet 2. The density of this saturated fluid may be described in terms of its liquid density and gas density.

An accelerator 6 is arranged within the conduit 5 between the fluid inlet 2 and the outlets 3, 4. The accelerator 6 is configured to accelerate the saturated fluid from the inlet 2 through the conduit 5 towards the outlets 3, 4. As the density of gas in the fluid is significantly lower than the density of liquid, this acceleration causes the gas density and liquid density to separate within the fluid, with portions of the fluid with higher gas density having higher velocities than portions of the fluid with lower gas density. As these higher gas density portions of the fluid are moving faster, with lower fluid densities, than the low gas density portions (which have relatively high liquid densities), the higher gas density portions of the fluid move to the interior edges of the conduit 5. That is, after the fluid has passed through the accelerator 6, the gas density of the fluid is higher at the interior edges of the conduit 5 than it is at the centre of the cross-section of the conduit 5. Similarly, the liquid density of the fluid is higher at the centre of the cross-section of the conduit 5 than it is at the interior edges of the conduit 5.

In the device 1 of FIG. 1, the accelerator 6 includes a series of three valves 6 with reducing inner diameters. More specifically, the inner diameter of each valve 6 is less than the inner diameter of its upstream adjacent valve 6 (i.e. the nearest valve 6 closer to the fluid inlet). For example, a first valve may have an inner diameter of 10 mm, and the next downstream valve has an inner diameter of 8 mm, with the following downstream valve having an inner diameter of 6 mm.

The device 1 of FIG. 1 includes a series of baffles 7 sequentially arranged along the conduit 5 between the fluid inlet 2 and the first outlet 3. Each baffle 7 is configured to direct the flow of the lower gas density fluid (higher liquid density fluid) towards the second outlet 4 and allow higher gas density fluid to pass around the baffle 7 towards the first outlet 3. In this way, the device separates gas density and liquid density in a refrigerant fluid, thereby reducing the gas density of the refrigeration fluid at the second outlet 4 of the device. As shown in FIG. 1, the baffles 7 are arranged across the centre of the cross-section of the conduit 5 while providing a gap (or a plurality of gaps) between the outer edges of the baffle 7 and the inner walls of the conduit 5. In this example, the lower gas density fluid impacts the baffle 7 and is directed towards the second outlet 4 while the higher gas density fluid passes through the gap(s) around the baffle 7 towards the first outlet 3.

Utilising a series of baffles 7 further improves the separation of gas density from the fluid. As shown in FIG. 1, a second baffle 7b is arranged in the conduit 5 downstream from the first baffle 7a. The first baffle 7a directs a portion of the fluid towards the second outlet 4 and allows another portion of fluid (with higher gas density than the first portion of fluid) to pass towards the second baffle 7b. Downstream (towards the first outlet 3) from the first baffle 7a, the gas density of the fluid remains similarly distributed with a higher gas density near the inner walls of the conduit 5 than near the centre of the conduit cross-section. This means the second baffle 7b can further separate the gas density from the (already increased gas density) fluid that passed around the first baffle 7a, in the same manner that the first baffle 7a separated the accelerated refrigerant fluid. Additional baffles 7 can be introduced to the device 1 and sequentially arranged along the conduit 5 between the accelerator 6 and first outlet 3 to further improve the gas density separation.

As shown in FIG. 1, the inner diameter of the conduit 5 narrows towards the first outlet 3. This keeps the velocity of the fluid high so that the gas density remains relatively high near the inner walls of the conduit 5, ensuring subsequent baffles 7 past the first baffle 7a are effective and that a greater number of baffles 7 leads to a higher amount of gas density separation. The size of the gap between the baffle 7 and the inner walls can be adjusted to control the separation of gas density provided by a given baffle 7. The size of gap should be controlled in relation to the speed of the fluid through the device 1 (i.e. the distribution of gas density over the cross-section of the conduit 5).

The device 1 includes a branching channel 8 leading from the first baffle 7a to the second outlet 4. The first baffle 7a directs fluid with lower gas density through the branching channel 8 towards the second outlet 4. As shown in FIG. 1, when the device 1 includes a plurality of baffles 7 then it is preferable for the device 1 to include plurality of a branching channels 8, with each channel 8 corresponding to an individual baffle 7. Each branching channel 8 leads from the corresponding baffle 7 to a manifold 9 arranged between the baffles 7 and the second outlet 3, such that lower gas density fluid is directed from a baffle 7, through a branching channel 8 into the manifold 9, and onto the second outlet 4. This arrangement reduces the mixing of low gas density portions of the fluid with higher gas density portions of the fluid, thereby improving the gas density separation provided by the device 1.

Figure 2:
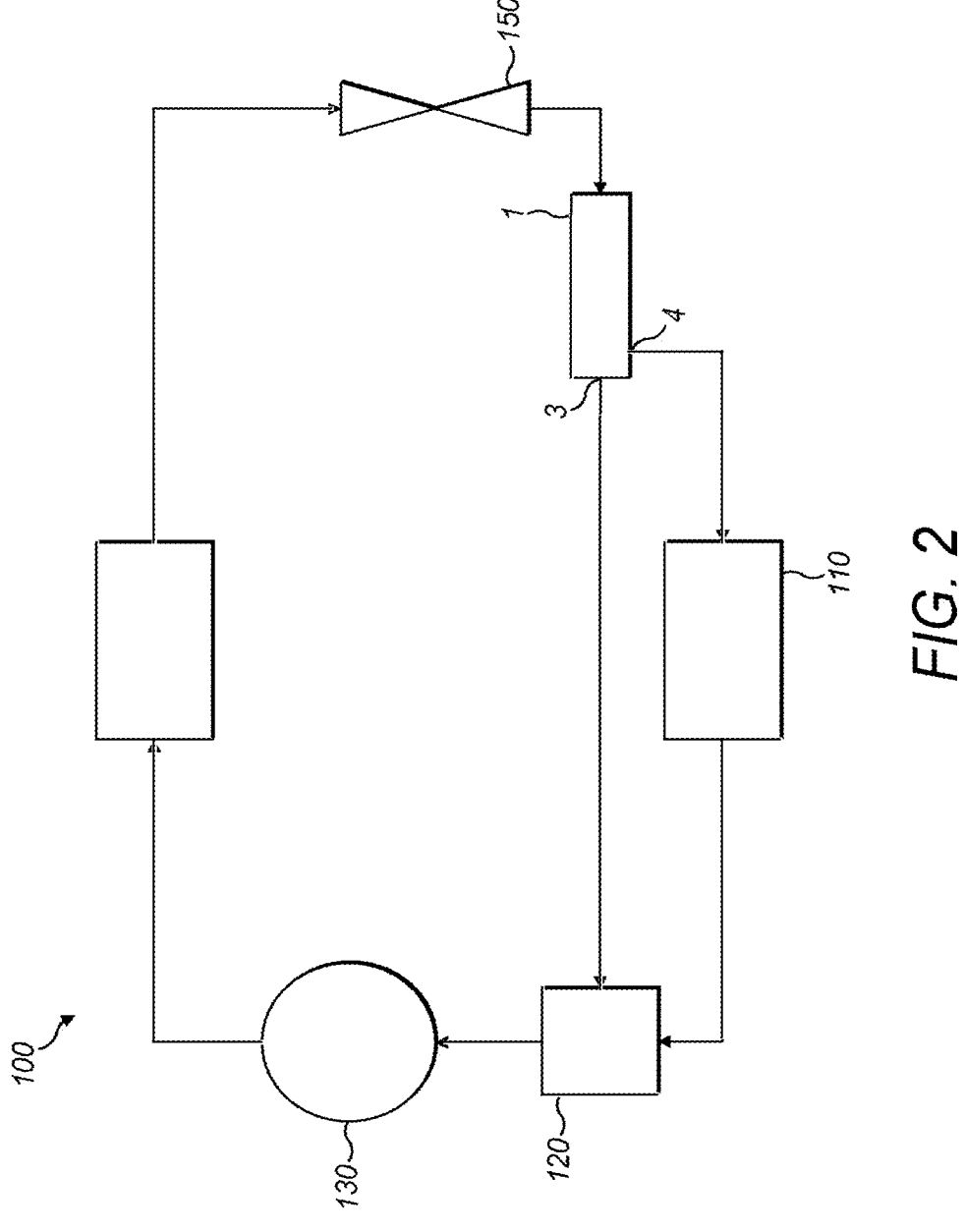
FIG. 2 is a schematic diagram of a refrigeration system according to the present invention, showing the direction of flow of circulating refrigerant between components in the system.

FIG. 2 shows how the device 1 may be implemented in a refrigeration system 100, where the arrows between components show the direction of refrigerant flow during operation. The device 1 is arranged between an expansion valve 150, and both an evaporator 110 and a buffer tank 120. Specifically, the expansion valve 150 is fluidly connected to the fluid inlet 2 of the device 1, the first outlet 3 of the device 1 is fluidly connected to the buffer tank 120, and the second outlet 4 of the device 1 is fluidly connected to the inlet of the evaporator 110 (the outlet of the evaporator 110 fluidly connecting to the buffer tank 120). This arrangement means that fluid with higher liquid density (i.e. lower gas density) passes through the evaporator 110 before reaching the buffer tank 120, while fluid with a higher gas density (i.e. lower liquid density) is directed straight to the buffer tank 120 without entering the evaporator 110. The buffer tank 120 is upstream from and connected to a compressor 130 which compresses the gaseous refrigerant and drives the refrigerant fluid through the system 100.

The distance travelled by fluid from the first outlet 3 to the compressor 130 is significantly less than the distance travelled by fluid from the second outlet 4 to the compressor 130. As a portion of the fluid (the high gas density fluid) returns to the compressor 130 without having to be driven through the evaporator 110, the work required to be done by the compressor 130 in order to drive the refrigerant is reduced and thus the energy efficiency of the system 100 is improved.

In addition, an increase in liquid density of the fluid in the evaporator 130 (relative to a system without the device 1) means that the fluid will move slower through the evaporator 130 and will stay in a saturated state at a lower temperature within the evaporator 130, thereby improving the refrigeration quality of the system 100.

The buffer tank 120 is included in the system 100 shown in FIG. 2 in order to prevent any liquid phase refrigerant (e.g. that exited the first outlet 3 of the device 1 or was not evaporated in the evaporator 110) from entering the compressor 130. Alternative gas-liquid separation components may be used instead of a buffer tank to prevent liquid entering the compressor. A buffer tank 120 or equivalent component is not needed in the system 100 if the device 1 is configured to prevent any liquid refrigerant from passing out the first outlet 3, and the evaporator 110 is configured to evaporate all of the refrigerant fluid—in such a system both the first outlet 3 and the evaporator 110 are directly connected to the compressor 130.

Figures 3, 4:
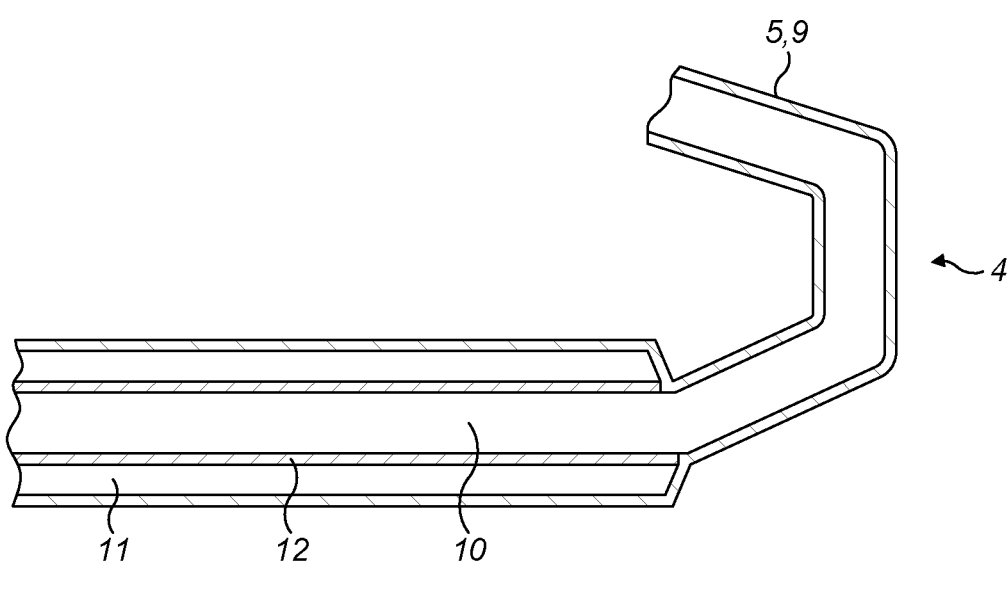
FIG. 3 shows a portion of a device according to an example configuration of the present invention.
FIG. 4 shows a portion of evaporator pipework according to an example configuration of the present invention.

FIG. 3 shows a portion of an example of the device 1, highlighting the second outlet 4. At the second outlet 4, the conduit 5 or manifold 9 (depending on the configuration of the device 1) may be considered an inner conduit 10, with an outer conduit 11 arranged around the inner conduit 10. The walls of the inner conduit 10, separating the inner conduit 10 from the outer conduit 11, comprise a membrane 12 that is permeable to gas and impermeable to liquid. This means that gas in the saturated fluid that reaches the second baffle 4 (e.g. after being directed towards the second outlet 4 by a baffle 4) may pass through the membrane 12 walls of the inner conduit 10 into the outer conduit 11—facilitated by the high gas density portions of the moving fluid being near the edges of the interior conduit 10. In some examples of the invention, the membrane 12 extends fully across the walls of the inner conduit 10 (i.e. the length and circumference of the inner conduit 10 walls) and the membrane 12 is self-supporting. In other examples the membrane 12 can be arranged in sections across the walls of the inner conduit 10 with support sections of the walls reinforcing the membrane 12 (e.g. a frame in front or behind the membrane 12, or a support element such as a beam next to the membrane 12 or between adjacent sections of membrane 12). In a refrigeration system 100, the inner conduit 10 is fluidly connected to the evaporator 110, while the outer conduit 11 fluidly connects to the compressor 130 but not the evaporator 110. In this way, the gas density of the fluid entering the evaporator 110 is further reduced, improving the refrigeration quality and reducing the work done by the compressor 130 driving the fluid.

As shown in FIG. 4, the inner conduit 10/outer conduit 11 arrangement may also be provided in the evaporator 110. FIG. 4 shows a portion of the evaporator pipework 111, where the pipework 111 comprises an inner conduit and outer conduit 11 arranged around the inner conduit 10, with the walls of the inner conduit 10 comprising a membrane 12 that is permeable to gas and impermeable to liquid. In use, as liquid refrigerant travels through the inner conduit 10 it evaporates (due to receiving energy from the higher temperature region surrounding the evaporator 110) and passes through the membrane 12 into the outer conduit 11, further reducing the gas density of the fluid in the inner conduit 10. Once in the outer conduit 11, the gas accelerates through the evaporator 110 towards the compressor 130, while the fluid remaining in the inner conduit 10 will slow down due to its increased liquid density. This pipework 111 configuration improves the quality of refrigeration provided and reduces the work required by the compressor 130 to drive the system 100. As with the inner conduit 10/outer conduit 11 arrangement at the second outlet 4, the membrane 12 comprised in the pipework 111 may extend fully across the walls of the inner conduit 10 (i.e. the length and circumference of the inner conduit 10 walls) and the membrane 12 is self-supporting. In other examples the membrane 12 can be arranged in sections across the walls of the inner conduit 10 with support sections of the walls reinforcing the membrane 12 (e.g. a frame in front or behind the membrane 12, or a support element such as a beam next to the membrane 12 or between adjacent sections of membrane 12).

If the evaporator 110 and the second outlet 4 both comprise inner conduits 10 and outer conduits 111, then the inner conduit 10 of the second outlet 4 directly links to the inner conduit 10 of the evaporator pipework 111, and the outer conduit 11 of the second outlet 4 may directly link to the outer conduit 11 of the pipework 111. Alternatively, in some examples of the invention the outer conduit 11 of the second outlet 4 does not connect to the pipework 111 and connects to another portion of the refrigeration system 100 (e.g. the buffer tank 120 or compressor 130).

The invention claimed is:

1. A device for reducing gas density in a liquid phase refrigerant, the device comprising:
   a fluid inlet;
   a first outlet;
   a second outlet;
   a conduit, linking the fluid inlet to the first outlet and the second outlet;
   an accelerator, arranged within the conduit between the fluid inlet and both the first outlet and the second outlet, wherein the accelerator is configured to accelerate a fluid from the fluid inlet towards the first outlet and the second outlet, thereby separating out saturated gas in the fluid to reduce the gas density in the fluid;
   a baffle, arranged within the conduit between the accelerator and the first outlet, wherein the baffle is configured to direct lower gas density fluid to flow towards the second outlet and allow higher gas density fluid to pass around the baffle towards the first outlet;
   wherein a compressor of a refrigeration system comprising the device is fluidly connected to the first outlet and the second outlet of the device;
   wherein an evaporator of the refrigeration system is arranged between the compressor and the second outlet of the device;
   wherein, in use, the fluid from the second outlet passes through the evaporator before entering the compressor and the fluid from the first outlet does not pass through the evaporator before entering the compressor; and
   wherein a buffer tank of the refrigeration system is arranged between the compressor and the first outlet of the device, and the buffer tank is arranged between the compressor and the evaporator.

2. The device of claim 1,
   wherein the baffle is a solid component through which the fluid cannot pass.

3. The device of claim 1,
   wherein the conduit comprises a branching channel leading from the baffle to the second outlet.

4. The device of claim 1,
   wherein the accelerator comprises a plurality of valves, wherein a first inner diameter of a first valve is greater than a second inner diameter of a second valve, and wherein the first valve is upstream from the second valve.

5. The device of claim 1, further comprising a plurality of baffles sequentially arranged along the conduit between the accelerator and the first outlet;
   wherein each baffle of the plurality of baffles is configured to direct the lower gas density fluid to flow towards the second outlet and allow the higher gas density fluid to pass around the baffle towards the first outlet.

6. The device of claim 5,
   wherein each baffle of the plurality of baffles is a solid component through which the fluid cannot pass.

7. The device of claim 5, wherein the conduit further comprises:
   a manifold arranged between the plurality of baffles and the second outlet; and
   a plurality of branching channels, wherein each branching channel of the plurality of branching channels leads from one of the plurality of baffles to the manifold.

8. The device of claim 1, wherein:
   the second outlet comprises an inner conduit and an outer conduit;
   the outer conduit is arranged around the inner conduit; and
   the inner conduit comprises walls having a membrane permeable to gas and impermeable to liquid.

9. The device of claim 8,
   wherein the membrane extends across a length and a circumference of the walls of the inner conduit.

10. The device of claim 1,
   wherein the device is configured to reduce the gas density of a pure refrigerant.

11. A refrigeration system comprising:
   a device that comprises:
      a fluid inlet;
      a first outlet;
      a second outlet;
         a conduit, linking the fluid inlet to the first outlet and the second outlet;
         an accelerator, arranged within the conduit between the fluid inlet and both the first outlet and the second outlet,
            wherein the accelerator is configured to accelerate a fluid from the fluid inlet towards the first outlet and the second outlet, thereby separating out saturated gas in the fluid to reduce the gas density in the fluid; and
         a baffle, arranged within the conduit between the accelerator and the first outlet, wherein the baffle is configured to direct lower gas density fluid to flow towards the second outlet and allow higher gas density fluid to pass around the baffle towards the first outlet;
   a compressor fluidly connected to the first outlet and the second outlet of the device; and
   an evaporator arranged between the compressor and the second outlet of the device, the evaporator comprising:
      evaporator pipework comprising:
         an outer conduit arranged around an inner conduit, wherein the inner conduit comprises walls having a membrane permeable to gas and impermeable to liquid;
      wherein, in use, the fluid from the second outlet passes through the evaporator before entering the compressor and the fluid from the first outlet does not pass through the evaporator before entering the compressor.

12. The refrigeration system of claim 11, wherein the membrane of the evaporator pipework extends across a length and a circumference of the walls of the inner conduit of the evaporator pipework.

13. The refrigeration system of claim 11, further comprising a buffer tank;

wherein the buffer tank is arranged between the compressor and the first outlet of the device, and the buffer tank is arranged between the compressor and the evaporator.

14. The refrigeration system of claim 11, wherein the refrigeration system is a closed refrigeration system such that fluid cannot leave the refrigeration system.

15. A refrigeration system comprising:

a device that comprises:

a fluid inlet;

a first outlet;

a second outlet;

a conduit, linking the fluid inlet to the first outlet and the second outlet;

an accelerator, arranged within the conduit between the fluid inlet and both the first outlet and the second outlet, wherein the accelerator is configured to accelerate a fluid from the fluid inlet towards the first outlet and the second outlet, thereby separating out saturated gas in the fluid to reduce the gas density in the fluid; and a baffle, arranged within the conduit between the accelerator and the first outlet, wherein the baffle is configured to direct lower gas density fluid to flow towards the second outlet and allow higher gas density fluid to pass around the baffle towards the first outlet a compressor fluidly connected to the first outlet and the second outlet of the device; and an evaporator arranged between the compressor and the second outlet of the device;

wherein, in use, the fluid from the second outlet passes through the evaporator before entering the compressor and the fluid from the first outlet does not pass through the evaporator before entering the compressor; and a buffer tank, wherein the buffer tank is arranged between the compressor and the first outlet of the device, and the buffer tank is arranged between the compressor and the evaporator.

16. The refrigeration system of claim 15, wherein the evaporator comprises evaporator pipework, wherein the evaporator pipework comprises an outer conduit arranged around an inner conduit, and wherein the inner conduit comprises walls having a membrane permeable to gas and impermeable to liquid.

17. The refrigeration system of claim 16, wherein the membrane of the evaporator pipework extends across a length and a circumference of the walls of the inner conduit of the evaporator pipework.

18. The refrigeration system of claim 16, wherein the membrane of the evaporator pipework is arranged in sections across a length and a circumference of the walls of the inner conduit of the evaporator pipework.

19. The refrigeration system of claim 18, wherein the walls of the inner conduit comprise support sections, wherein the support sections of the walls reinforce the membrane of the evaporator pipework.

20. The refrigeration system of claim 15, an expansion valve, wherein the expansion valve is fluidly connected to the fluid inlet of the device.

* * * * *